(12) United States Patent
    Roth et al.

(10) Patent No.: US 10,029,700 B2
(45) Date of Patent: Jul. 24, 2018

(54) INFOTAINMENT SYSTEM WITH HEAD-UP DISPLAY FOR SYMBOL PROJECTION

(71) Applicant: Harman Becker Automotive Systems GmbH, Karlsbad (DE)

(72) Inventors: Hans Roth, Karlsruhe (DE); Olaf Preissner, Kirchheim unter Teck (DE); Christoph Reifenrath, Erftstadt (DE); Michael Reuss, Bretten (DE); Stephan Bergmann, Muggensturm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 14/654,467

(22) PCT Filed: Dec. 19, 2013

(86) PCT No.: PCT/EP2013/003861
§ 371 (c)(1),
(2) Date: Jun. 19, 2015

(87) PCT Pub. No.: WO2014/095068
PCT Pub. Date: Jun. 26, 2014

(65) Prior Publication Data
US 2015/0331487 A1    Nov. 19, 2015

Related U.S. Application Data

(60) Provisional application No. 61/745,229, filed on Dec. 21, 2012.

(51) Int. Cl.
*G06F 3/01*    (2006.01)
*G01C 21/36*    (2006.01)
(Continued)

(52) U.S. Cl.
CPC ............. *B60W 50/10* (2013.01); *B60K 35/00* (2013.01); *B60K 37/00* (2013.01); *B60Q 9/008* (2013.01);
(Continued)

(58) Field of Classification Search
CPC .... G02B 2027/0181; G02B 2027/0183; G09G 2380/10; B60W 50/10
See application file for complete search history.

(56) References Cited

U.S. PATENT DOCUMENTS

| 5,214,413 A | 5/1993 | Okabayashi et al. |
| 6,829,388 B1 * | 12/2004 | Sakurai ..................... G06T 7/12 340/435 |

(Continued)

FOREIGN PATENT DOCUMENTS

| DE | 102008060766 | * 9/2009 | .......... G01C 21/365 |
| EP | 1720131 A1 | 11/2006 | |

(Continued)

OTHER PUBLICATIONS

Doshi, A. et al., "A Novel Active Heads-Up Display for Driver Assistance," IEEE Transactions on Systems, Man, and Cybernetics—Part B: Cybernetics, vol. 39, No. 1, Feb. 2009, 10 pages.

(Continued)

*Primary Examiner* — Srilakshmi K Kumar
*Assistant Examiner* — Karin Kiyabu
(74) *Attorney, Agent, or Firm* — McCoy Russell LLP

(57) ABSTRACT

Embodiments are disclosed for vehicle systems. An example system for a vehicle, includes
  a head-up display, and
  a central unit connected to the head-up display,
  wherein the head-up display is configured to project an image onto a front windshield of the vehicle or onto a separate combiner,
(Continued)

wherein the central unit is configured to send image data
to the connected head-up display to be displayed,
to ascertain a position of the user's eyes,
to output a symbol within the image data,
to ascertain a first virtual point and a second virtual point in a surrounding of the vehicle based on a recorded image of the surrounding and/or a current position of the vehicle, and
to position the symbol such that a starting point of the symbol overlaps the first virtual point and an end point of the symbol overlaps the second virtual point in a view of the user.

7 Claims, 13 Drawing Sheets

(51) Int. Cl.

| | | |
|---|---|---|
| G02B 27/01 | (2006.01) | |
| B60W 50/10 | (2012.01) | |
| B60R 11/02 | (2006.01) | |
| H04N 13/02 | (2006.01) | |
| H04N 13/04 | (2006.01) | |
| H04N 9/31 | (2006.01) | |
| B60K 35/00 | (2006.01) | |
| B60Q 9/00 | (2006.01) | |
| H04M 3/54 | (2006.01) | |
| H04M 1/60 | (2006.01) | |
| H04W 4/00 | (2018.01) | |
| B60K 37/00 | (2006.01) | |
| H04W 4/04 | (2009.01) | |
| H04W 4/16 | (2009.01) | |
| G08G 1/00 | (2006.01) | |
| G08G 1/0962 | (2006.01) | |
| G06F 3/0481 | (2013.01) | |
| H04N 101/00 | (2006.01) | |

(52) U.S. Cl.
CPC ........ *B60R 11/0229* (2013.01); *G01C 21/365* (2013.01); *G02B 27/01* (2013.01); *G02B 27/0101* (2013.01); *G06F 3/013* (2013.01); *G06F 3/017* (2013.01); *G06F 3/0481* (2013.01); *G08G 1/00* (2013.01); *G08G 1/09623* (2013.01); *H04M 1/6075* (2013.01); *H04M 3/543* (2013.01); *H04N 9/31* (2013.01); *H04N 13/0242* (2013.01); *H04N 13/0278* (2013.01); *H04N 13/0282* (2013.01); *H04N 13/0459* (2013.01); *H04W 4/008* (2013.01); *H04W 4/046* (2013.01); *H04W 4/16* (2013.01); *B60K 2350/1052* (2013.01); *B60K 2350/1072* (2013.01); *B60K 2350/1076* (2013.01); *B60K 2350/2052* (2013.01); *B60K 2350/2095* (2013.01); *G02B 2027/014* (2013.01); *G02B 2027/0138* (2013.01); *G02B 2027/0141* (2013.01); *G06F 2203/04804* (2013.01); *H04N 2101/00* (2013.01)

(56) References Cited

U.S. PATENT DOCUMENTS

| | | | | |
|---|---|---|---|---|
| 9,293,043 | B2* | 3/2016 | Yamada | G08G 1/096716 |
| 2002/0049534 | A1* | 4/2002 | Yuda | G01C 21/365 |
| | | | | 701/533 |
| 2009/0243963 | A1 | 10/2009 | Hotta et al. | |
| 2010/0073636 | A1* | 3/2010 | Sasaki | G02B 27/0093 |
| | | | | 353/13 |
| 2010/0073773 | A1* | 3/2010 | Hotta | G02B 27/01 |
| | | | | 359/630 |
| 2010/0164702 | A1* | 7/2010 | Sasaki | G01B 21/22 |
| | | | | 340/438 |
| 2010/0238283 | A1* | 9/2010 | Kim | B60W 50/16 |
| | | | | 348/135 |
| 2010/0253539 | A1* | 10/2010 | Seder | G01S 13/723 |
| | | | | 340/903 |
| 2010/0253543 | A1* | 10/2010 | Szczerba | B60Q 9/005 |
| | | | | 340/932.2 |
| 2011/0298693 | A1* | 12/2011 | Tasaki | G01C 21/365 |
| | | | | 345/7 |
| 2012/0154441 | A1* | 6/2012 | Kim | G06K 9/00832 |
| | | | | 345/633 |
| 2012/0226392 | A1* | 9/2012 | Kataoka | G08G 1/167 |
| | | | | 701/1 |
| 2012/0242694 | A1 | 9/2012 | Hotta et al. | |
| 2012/0259546 | A1* | 10/2012 | Kim | G02B 27/01 |
| | | | | 701/527 |
| 2012/0313850 | A1* | 12/2012 | Ishida | G02B 27/01 |
| | | | | 345/156 |
| 2013/0188258 | A1* | 7/2013 | Mathieu | G08G 1/167 |
| | | | | 359/630 |
| 2013/0265232 | A1* | 10/2013 | Yun | G09G 3/3208 |
| | | | | 345/158 |
| 2014/0379164 | A1* | 12/2014 | Joh | G01C 21/30 |
| | | | | 701/1 |
| 2016/0167514 | A1* | 6/2016 | Nishizaki | G02B 27/0101 |
| | | | | 345/7 |
| 2016/0365068 | A1* | 12/2016 | Sakaguchi | G09G 5/10 |

FOREIGN PATENT DOCUMENTS

| | | | |
|---|---|---|---|
| JP | 10-096776 | * | 4/1998 |
| JP | 2003341383 A | | 12/2003 |
| JP | 2005201635 A | * | 7/2005 |
| JP | 2006284458 A | | 10/2006 |
| JP | 2006343194 A | * | 12/2006 |
| JP | 2009246505 A | | 10/2009 |
| JP | 2010-096874 | * | 4/2010 |
| JP | 2012-149950 A | * | 8/2012 |
| JP | 2012198149 A | | 10/2012 |
| KR | 1020100026466 A | | 3/2010 |

OTHER PUBLICATIONS

ISA European Patent Office, International Search Report Issued in Application No. PCT/EP2013/003861, dated May 9, 2014, WIPO, 3 pages.

IPEA European Patent Office, International Preliminary Report on Patentability Issued in Application No. PCT/EP2013/003861, Report Completed Apr. 10, 2015, WIPO, 6 pages.

Schneid, M. et al., "Development and testing of a augmented reality head-up display in a vehicle," (German title: Entwicklung and Erprobung eines kontaktanalogen Head-up-Displays im Fahrzeug), Dissertation, Technical University of Munich, Jan. 2009, 164 pages. (Submitted with Machine Translation of Section 2.1.2 as English Explanation of Relevance).

Japan Patent Office, Office Action Issued in Application No. 2015-548283, dated Dec. 18, 2017, 10 pages.

* cited by examiner

INFOTAINMENT SYSTEM WITH HEAD-UP DISPLAY FOR SYMBOL PROJECTION

CROSS REFERENCE TO RELATED APPLICATIONS

The present application is a U.S. National Phase of International Patent Application Ser. No. PCT/EP/2013/003861, entitled "INFOTAINMENT SYSTEM," filed on Dec. 19, 2013, which claims priority to U.S. Provisional Patent Application No. 61/745,229, entitled "INFOTAINMENT SYSTEM," filed on Dec. 21, 2012, the entire contents of each of which are hereby incorporated by reference for all purposes.

TECHNICAL FIELD

The invention relates to an infotainment system for a vehicle.

BACKGROUND AND SUMMARY

EP 1 720 131 B1 shows an augmented reality system with real marker object identification. The system comprises a video camera for gathering image data from a real environment. The real environment represents any appropriate area, such as a room of a house, a portion of a specific landscape, or any other scene of interest. The real environment represents a living room comprising a plurality of real objects for instance in the form of walls and furniture. Moreover, the real environment comprise further real objects that are considered as marker objects which have any appropriate configuration so as to be readily identified by automated image processing algorithms. The marker objects have formed thereon significant patterns that may easily be identified, wherein the shape of the marker objects may be designed so as to allow identification thereof from a plurality of different viewing angles. The marker objects also represent substantially two-dimensional configurations having formed thereon respective identification patterns.

The system further comprises a means for identifying the marker objects on the basis of image data provided by the camera. The identifying means may comprise well-known pattern recognition algorithms for comparing image data with predefined templates representing the marker objects. The identifying means may have implemented therein an algorithm for converting an image obtained by the camera into a black and white image on the basis of predefined illumination threshold values. The algorithm are further configured to divide the image into predefined segments, such as squares, and to search for pre-trained pattern templates in each of the segments, wherein the templates represent significant portions of the marker objects.

First the live video image is turned into a black and white image based on a lighting threshold value. This image is then searched for square regions. The software finds all the squares in the binary image, many of which are not the tracking markers, such as the objects. For each square, the pattern inside the square is matched against some pre-trained pattern templates. If there is a match, then the software has found one of the tracking markers, such as the objects. The software then use the known square size and pattern orientation to calculate the position of the real video camera relative to the physical marker such as the objects. Then, a 3×4 matrix is filled with the video camera's real world coordinates relative to the identified marker. This matrix is then used to set the position of the virtual camera coordinates. Since the virtual and real camera coordinates are the same, the computer graphics that are drawn precisely superimpose the real marker object at the specified position. Thereafter, a rendering engine is used for setting the virtual camera coordinates and drawing the virtual images.

The system further comprises means for combining the image data received from the camera with object data obtained from an object data generator. The combining means comprise a tracking system, a distance measurement system and a rendering system. Generally, the combining means is configured to incorporate image data obtained from the generator for a correspondingly identified marker object so as to create virtual image data representing a three-dimensional image of the environment with additional virtual objects corresponding to the marker objects. Hereby, the combining means is configured to determine the respective positions of the marker objects within the real environment and also to track a relative motion between the marker objects with respect to any static objects in the environment and with respect to a point of view defined by the camera.

The system further comprises output means configured to provide the virtual image data, including the virtual objects generated by the generator wherein, in preferred embodiments, the output means is also configured to provide, in addition to image data, other types of data, such as audio data, olfactory data, tactile data, and the like. In operation, the camera creates image data of the environment, wherein the image data corresponds to a dynamic state of the environment which is represented by merely moving the camera with respect to the environment, or by providing moveable objects within the environment, for instance the marker objects or one or more of the objects are moveable. The point of view of the environment is changed by moving around the camera within the environment, thereby allowing to observe especially the marker objects from different perspectives so as to enable the assessment of virtual objects created by the generator from different points of view.

The image data provided by the camera which are continuously updated, are received by the identifying means, which recognizes the marker objects and enables the tracking of the marker objects once they are identified, even if pattern recognition is hampered by continuously changing the point of view by, for instance, moving the camera or the marker objects. After identifying a predefined pattern associated with the marker objects within the image data, the identifying means inform the combining means about the presence of a marker object within a specified image data area and based on this information, the means then continuously track the corresponding object represented by the image data used for identifying the marker objects assuming that the marker objects will not vanish over time. The process of identifying the marker objects is performed substantially continuously or is repeated on a regular basis so as to confirm the presence of the marker objects and also to verify or enhance the tracking accuracy of the combining means. Based on the image data of the environment and the information provided by the identifying means, the combining means creates three-dimensional image data and superimposes corresponding three-dimensional image data received from the object generator, wherein the three-dimensional object data are permanently updated on the basis of the tracking operation of the means.

The means may, based on the information of the identifying means, calculate the position of the camera with respect to the marker objects and use this coordinate information for determining the coordinates of a virtual camera, thereby allowing a precise "overlay" of the object data delivered by the generator with the image data of the marker objects. The coordinate information also includes data on the relative orientation of the marker objects with respect to the camera, thereby enabling the combining means to correctly adapt the orientation of the virtual object. Finally, the combined three-dimensional virtual image data is presented by the output means in any appropriate form. The output means may comprise appropriate display means so as to visualize the environment including virtual objects associated with the marker objects. When operating the system it is advantageous to pre-install recognition criteria for at least one marker object so as to allow a substantially reliable real-time image processing. Moreover, the correlation between a respective marker object and one or more virtual objects may be established prior to the operation of the system or is designed so as to allow an interactive definition of an assignment of virtual objects to marker objects. For example, upon user request, virtual objects initially assigned to the marker object are assigned to the marker object and vice versa. Moreover, a plurality of virtual objects is assigned to a single marker object and a respective one of the plurality of virtual objects is selected by the user, by a software application.

"Design and testing of a augmented reality head-up display in a vehicle" (German title: Entwicklung and Erprobung eines kontaktanalogen Head-up-Displays im Fahrzeug), M. Schneid, Dissertation, 2009, 2.1.2 Optical System, page 6 and 7 shows that the light beam of a head-up display are reflected by the windshield or a separate combiner into the driver's eyes. The size of the optical elements define the size of the light beam and the size fo the eyebox, that means the area in the y-z-plane, the eyes of the driver have to be positioned in to recognize the projected image. Having a bearing of the last mirror the reflection area on the windshield and the position of the eyebox can be adjusted.

The U.S. Pat. No. 5,214,413 shows a head-up display apparatus used as an instrument display of an automobile that comprises a hologram combiner provided on the front windshield on which an image is displayed overlapping the field of view. The apparatus includes a display luminosity control system which varies the brightness of the display image gradually or delays an increase and decrease in the brightness in accordance with variations in the ambient light level so as to allow a driver's eyes to adapt to the variations.

The object of the invention is to improve a system for a motor vehicle.

This object is attained by a system with the features of independent claim 1. Advantageous refinements are the subject of dependent claims and included in the description.

Therefore a system for a vehicle is provided. The system may be part of an infotainment system of the vehicle.

The system has a head-up display and a central unit connected to the head-up display.

The head-up display is configured to project an image onto the front windshield of the vehicle or onto a separate combiner.

The central unit is configured to send image data to the connected head-up display to be displayed.

The central unit is configured to ascertain a user's point of view. The user's point of view is the position of the user's eyes.

The central unit is configured to output a symbol within the image data.

The central unit is configured to ascertain a virtual point in the surrounding of the vehicle based on a recorded image of the surrounding and/or a current position of the vehicle. The virtual point in the surrounding may concurrently calculated. The virtual point in the surrounding may be calculated based on image data and/or map data.

The central unit is configured to align in the view of the user at least one point of the symbol to the virtual point. The virtual point in the surrounding may be overlaid in the view of the user e.g. by a dot of the symbol in the image displayed. The alignment is based on the user's point of view.

Tests by the applicant have shown that the route guidance using simple symbols are often misleading the driver, if the density of intersections is locally high. Using the augmented reality the symbols may point directly into the corresponding road. A possible movement of the head of the user is taken into account, resulting in a very precise guidance.

Another object of the invention is to improve a method for controlling a displayed image on a front windshield or on a separate combiner.

Therefore a method to control a displayed image on a front windshield of the vehicle or on a separate combiner is provided. The method comprises the steps:

projecting an image onto the front windshield of the vehicle or onto the combiner by means of a head-up display, sending image data by means of a central unit to the connected head-up display to be displayed, ascertaining a user's point of view by means of the central unit, the user's point of view being the position of the user's eyes, outputting a symbol within the image data by means of the central unit, ascertaining a virtual point in the surrounding of the vehicle based on a recorded image of the surrounding and/or a current position of the vehicle by means of the central unit, and aligning in the view of the user at least one point of the symbol to the virtual point by means of the central unit, wherein the alignment is based on the user's point of view.

The embodiments described hereinafter refer to both the system and the method.

According to one embodiment, the central unit may be configured to calculate the alignment of the at least one point of the symbol based on geometrical optics and/or trigonometric functions.

According to one embodiment, the infotainment system may have adjustment means for adjusting the position of the projected image within the plane of the front windshield or the combiner. The central unit may be configured to ascertain the user's point of view based on parameters of the adjustment of the projected image.

According to one embodiment, the infotainment system may have adjustment means for adjusting the position of a user's seat. The central unit may be configured to ascertain the user's point of view based on parameters of the adjustment of the user's seat.

According to one embodiment, the infotainment system may have an internal camera recording an image of the user. The central unit may be configured to recognize the user's eyes or the user's head. The central unit may be configured to ascertain the position of the user's eyes or the user's head within the recorded image of the user.

According to one embodiment, the central unit may be configured to track the position of the user's eyes or the user's head concurrently.

According to one embodiment, the central unit may be configured to align the position of the at least one point of the symbol to the virtual point concurrently based on at least one of a shift of the virtual point and a shift of the position of the user's eyes or the user's head.

According to one embodiment, the infotainment system may have a capture device recording an image of the surrounding. The central unit may be configured to ascertain a three dimensional space of the surrounding based on image data of the surrounding. The central unit may be configured to recognize an object within the image of the surrounding. The recognized object may have the virtual point in the three dimensional space. The central unit may be configured to align the at least one point of the symbol to the virtual point of the recognized object based on the position of the virtual point of the recognized object and the user's point of view.

According to one embodiment, the central unit may be configured to ascertain a three dimensional space of the surrounding based on map data of the surrounding. The central unit may be configured to recognize an object within the map data of the surrounding. The recognized object may have the virtual point in the three dimensional space. The central unit may be configured to align the at least one point of the symbol to the virtual point of the recognized object based on the position of the virtual point of the recognized object and the user's point of view.

According to one embodiment, the central unit may be configured to change the shape and/or the transparency and/or the colour of the symbol based on the user's point of view.

The previously described embodiments are especially advantageous both individually and in combination. In this regard, all embodiments may be combined with one another. Some possible combinations are explained in the description of the exemplary embodiments shown in the figures. These possible combinations of the refinement variants, depicted therein, are not definitive, however.

BRIEF DESCRIPTION OF FIGURES

The invention will be described in greater detail hereinafter by exemplary embodiments using graphic illustrations.

Shown are.

DETAILED DESCRIPTION

Figure 1:
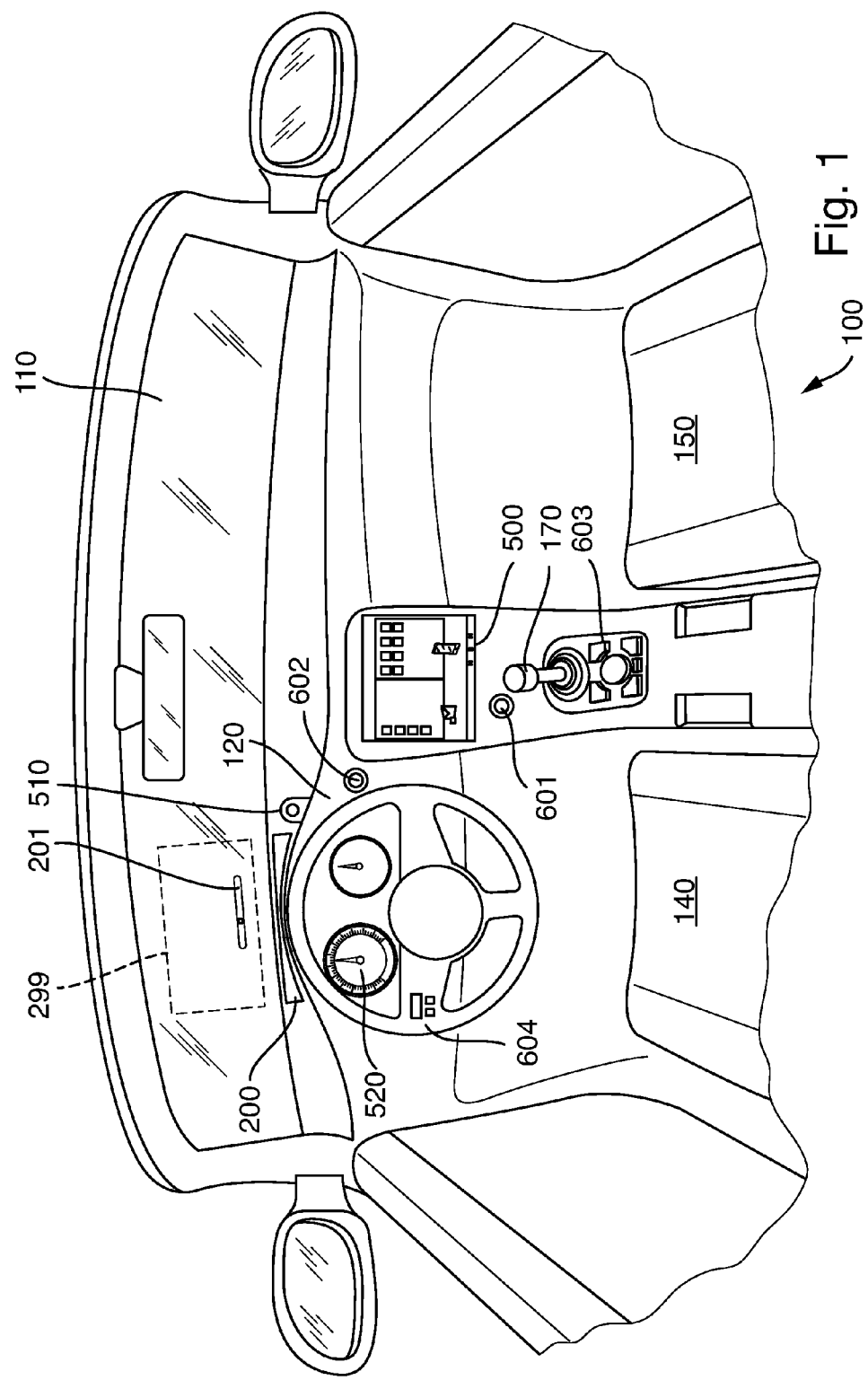
FIG. 1 a schematic representation of a vehicle interior.

FIG. 1 shows a schematic representation of a vehicle interior. According to one embodiment of FIG. 1, the vehicle 100 may include a driver seat 140 and a passenger seat 150. The vehicle 100 may further include a steering wheel 130 on the driver's side and a gear shift 170 and a front windshield 110. According to one embodiment of FIG. 1, a system may be provided, the system also referred to as an infotainment system providing information and entertainment functionality.

The system may have a central unit 500 in the form of a user interface. The system may have, or be in communication with an instrument cluster display 520. According to one embodiment, the instrument cluster display 520 may be arranged inline with the position of steering wheel 130, so that the user may see the displayed information content through the openings in steering wheel 130. The instrument cluster display 520 may be a color screen.

The system may have a head-up display 200. The head-up display 200 may also be referred to as head unit display. The head-up display 200 may be configured to project an image 201 onto front windshield 110. A surface of front windshield 110 may reflect the projected image 201 towards the user, in the case of the embodiment of FIG. 1, towards the driver of the vehicle 100. According to one embodiment shown in FIG. 1, the projected image 201 can be of the size of a reflection area 299. The form of front windshield 110 may deviate from a flat reflection surface, and an electronic rectification and/or optical rectification may be used.

The system may have adjustment means for adjusting the position of the projected image 201 within the plane the front windshield 110. The adjustment means may comprise an actuating drive controlling the position of an optical element of the head-up display 200 and/or the head-up display 200 itself. By means of parameters the position and/or size of the reflection area 299 within the front windshield 110 may be controlled. The central unit 500 may be configured to ascertain the position of the user's eyes based on parameters of the adjustment of the projected image 201.

According to one embodiment of FIG. 1 the system may have an input device 601, 602, 603, 604, 605. A Sensor 602 may be one input device 602 positioned in the dashboard 120 sensitive toward the steering wheel 130 of the vehicle 100. The sensor 602 may be arranged and configured to determine a position and/or a movement of a user's hand between the steering wheel 130 and dashboard 120. Another sensor 601 may be positioned in the center console to enable input in the area of central unit 500.

The system may have an input device 603 in the central console. The input device 603 may be part of the user interface, and may have one or more push-buttons, input-wheels, and so forth. The system may have an input device 604 integrated in steering wheel 130, having one or more push-buttons, switches and so forth. The system may have an internal camera 510 recording an image of the user.

Figure 2:
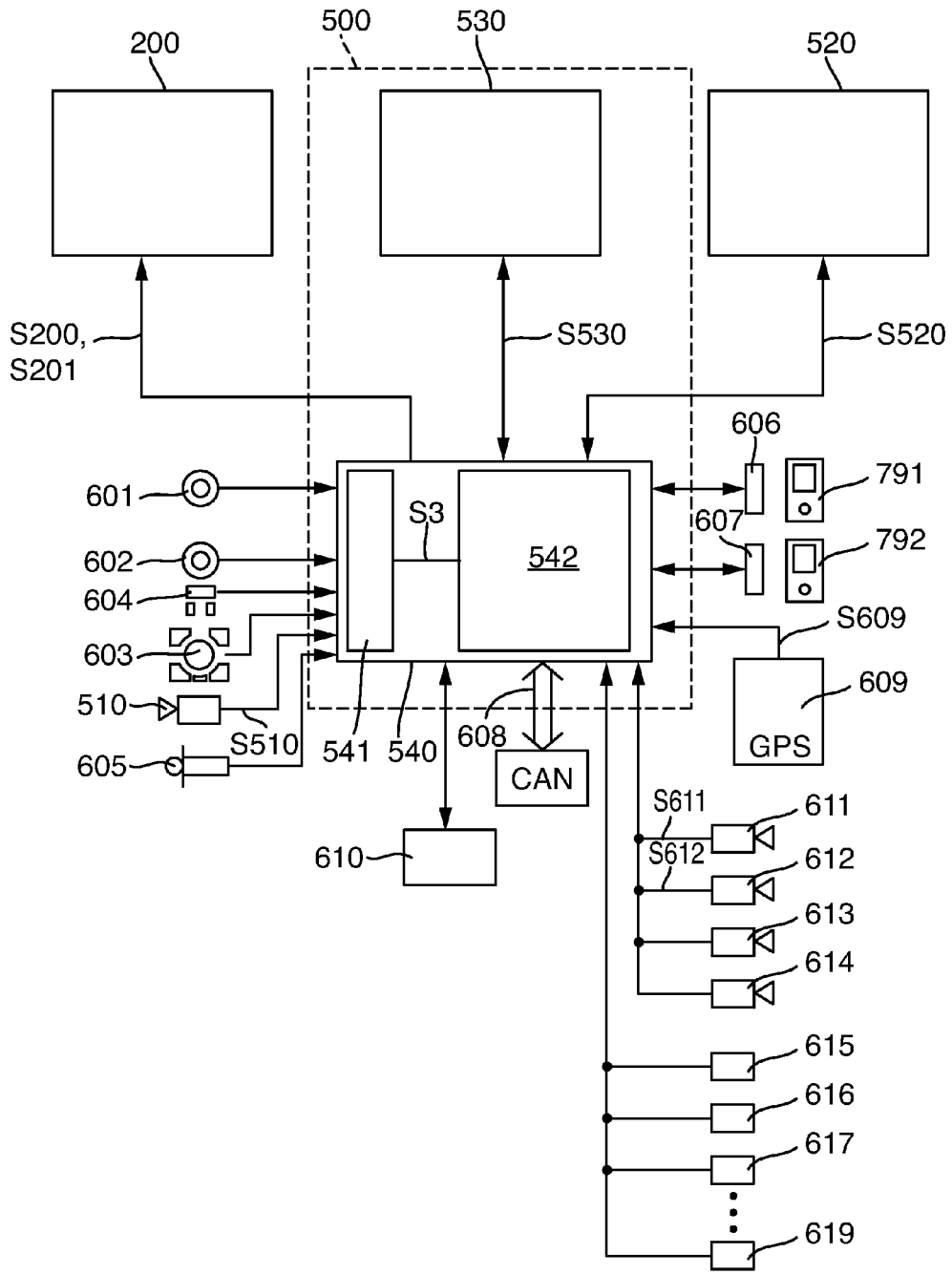
FIG. 2 a schematic block diagram of a system for a motor vehicle.

FIG. 2 shows a block diagram of an example of the system for a motor vehicle 100. The system may have a central unit 500. The central unit 500 may have a circuit 540. The circuit 540 may have a processor to run a program. The circuit 540 may have a plurality of interfaces to connect other devices 601 etc. . . . The central unit 500 may have a central information display 530 that may be centrally arranged in dashboard 120 or center console of the vehicle 100. The circuit 540 and the central information display 530 may be located distanced from each other. Alternatively the circuit 540 and the central information display 530 may be integrated into one case. The central information display 530 may be touch screen, comprising a touch sensitive surface for user input.

According to one embodiment in FIG. 2, the circuit 540 may have a function block 541 for evaluating input signals. According to one embodiment of FIG. 2 sensors 601, 602 and input devices 603, 604 and a microphone 605 to record the voice of the user may be connected. The central unit 500 may be configured to run a program for voice recognition for vocal control inputs. The system may have an internal camera 510 capturing a user's face. The internal camera 510 may send image data S510 to the function block 541 for evaluation. The function block 541 of the central unit 500 may be configured to recognize the user's eyes or the user's head. The function block 541 of the central unit 500 may be configured to ascertain a position of the user's eyes or the user's head concurrently. The function block 541 can be realized by hardware or as a program sequence by software. The function block 541 may be configured to output a position signal S3 includin data, e.g. a vector or matrix, of the position of the user's eyes or head in one or more dimensions. The position signal S3 may include position information for six dimensions, three degrees of translation and three degrees of rotation. The position signal S3 may be input to the control function block 542. The function block 542 of the circuit 540 may be configured to generate image data S200 output to the head-up display 200. The function block 542 of the circuit 540 may be configured to generate image data S530 output to the central display 530 of the central unit 500 and image data S520 output to the display 520. The function block 542 may be configured to generate the image data S200, S530, S520 based on the position signal S3.

A head-up display 200 and/or an instrument cluster display 520 and/or a central information display 530 of the central unit 500 and/or a first sensor 601 and/or a second sensor 602 and/or a first near field connection device 606 for connection with a mobile device 791 and/or a second near field connection device 607 for connection with a mobile device 792 and/or an input device 603, 604 may be connected to or in communication with circuit 540. The sensor 601, 602 may be of a contactless type. The sensor 601, 602 may be an infrared sensor.

According to one embodiment, an system of a vehicle 100 may include an imaging system. The system may have a head-up display 200. The system may have a circuit 540 of a central unit 500 connectable to head-up display 200 and to central information display 530. The central unit 500 may be configured to send image data S200 to the head-up display 200 to be displayed. The head-up display 200 may be configured to project an image 201 onto the front windshield 110, as shown in FIG. 1. The image 201 may be based on first image data S200.

The central unit 500 may be configured to ascertain a user's point of view, the user's point of view being the position of the user's eyes. To ascertain the position of the user's eyes, the central unit 500 may be configured to evaluate image data S510 of an internal camera 510, recognizing the user's eyes and/or head and their position within the image captured.

The image 201 may be projected within an area 299. The projected image 201 may be predefined, and may be adjustable by the user. The area 299 may be positioned to the driver's view. The position of the area 299 may be adjusted to steering wheel 130, so that the image 201 is viewable by the driver who is also able to observe the traffic in front of the vehicle 100. The image 201 may be at least partially transparent, such as semitransparent. At least parts of the area 299 may be transparent during driving, so that the view of the driver is not disturbed significantly.

The system may have an interface 608 to a bus of the vehicle, e.g., a CAN bus, to retrieve data of the vehicle, e.g., the current speed, vehicle rain sensor data, and so forth. The system may have a satellite receiver 609 to receive position data S609 of the current position of the vehicle, such as GPS data or GLONASS data. The system may have a transceiver 610 for communicating with a wireless network such as, for example, a UMTS network, a LTE network or a WLAN network.

The system may have one or more cameras 611, 612, 613, 614 positioned to record an image of the surrounding 400 of the vehicle 100. According to one embodiment, the central unit 500 may be connected to a front camera 611 capturing image data S611 of the road and traffic in front of the vehicle 100. The central unit 500 may be connected to a back camera 612 capturing image data S612 of the road and traffic behind the vehicle 100. The central unit 500 may be connected to a left camera 613 and/or to a right camera 614 recording an image correspondingly. The one or more cameras 611, 612, 613, 614 may be used to record the complete surrounding of the vehicle 100 concurrently. The circuit 540 of the central unit 500 may be configured to run a program of object recognition to recognize objects in the recorded image data S611, S612. The recognized object may be a road user, like a vehicle.

The system may have one or more distance sensors 615, 616, 617, 619. The distance sensors 615, 616, 617, 619 may be ultrasonic sensors or radar sensors, or any other device or system for measuring a distance to an object in the surroundings of the vehicle 100. The one or more distance sensors 615, 616, 617, 619 may be connectable to central unit 500.

According to one embodiment of FIG. 2 the system may have adjustment means for adjusting the position of the projected image 201 within the plane the front windshield 110. The adjustment means may be electromechanical drives for changing the position of the head-up display 200 or an optical element thereof. The central unit 500 may be configured to send parameters S201 for the adjustment to the head-up display 200. The central unit 500 may be configured to ascertain the user's point of view 301 based on parameters S201 of the adjustment of the projected image 201. The user may adjust the projected image 201 by inputting drive controls, the parameters S201 are based on.

Figure 3:
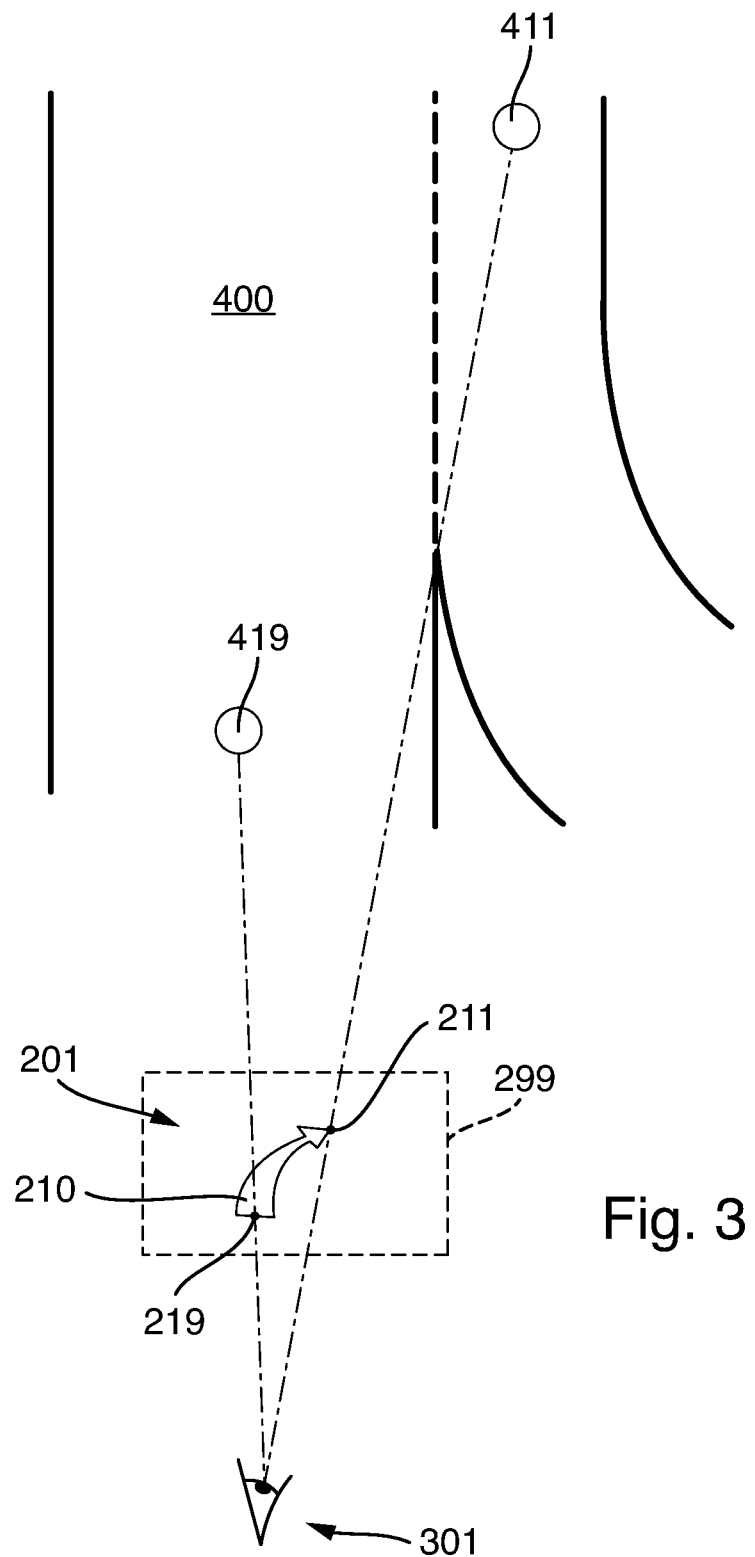
FIG. 3 a schematic representation of viewing directions in an imaging system.

FIG. 3 shows a schematic diagram for positioning a symbol by mean of a head-up display 200 according to FIG. 1. According to one embodiment an system of a vehicle 100 is provided. The system may have a head-up display 200. The system may have a central unit 500 connectable to the head-up display 200. The central unit 500 may be configured to send image data S200 to the head-up display 200 to be displayed. The head-up display 200 may be configured to project an image 201 on the front windshield 110 of the vehicle 100. The image 201 may be based on the image data S201.

The central unit 500 may be configured to output a symbol 210 of a manoeuvre point of route navigation. The symbol 210 may extend from a starting point 219 to an end point 211. The central unit 500 may be configured to position the symbol 210 within the image data S200. The symbol 210 may be positioned, so that the starting point 219 and a first virtual point 419 on a road of the surrounding 400 of the vehicle 100 overlap in the view of the user. The starting point 219 and the end point 211 may also be referred to as image dot of the symbol. The first virtual point 419 on the road depends on the current position of the vehicle 100.

The symbol 210 may be positioned, so that the end point 211 and a second virtual point 411 on the road overlap in the view of the user. The virtual point 411, 419 is a point in the surrounding, its position in a three dimensional space being calculated from data. The virtual point 411, 419 may be a part of a recognized object, such as a road part. The virtual point 411, 419 is a calculated geometric location relating to a point of the surrounding. The second virtual point 411 on the road depends on the current position of the vehicle 411. Both positioning functionalities may be combined. The central unit 500 may be configured to change the size and/or shape of the displayed symbol. The size and/or shape of the displayed symbol may be changed, so that the starting point 219 and a first virtual point 419 on the road overlap and/or so that the end point 211 and a second virtual point 411 on the road overlap.

The central unit 500 may be configured to output the symbol 210 within the image data S200. The central unit 500 may be configured to ascertain the virtual point 411 in the surrounding 400 of the vehicle 100 based on a recorded image of the surrounding 400. According to one embodiment as shown in FIG. 2 the central unit 500 may be configured to evaluate image data S611 of a camera 611 recording the image of the surrounding 400. Alternatively or in combination the central unit 500 may be configured to ascertain the virtual point 411 in the surrounding 400 of the vehicle 100 based on a current position of the vehicle 100. The central unit 500 may be configured to ascertain the current position based on the satellite data S609 and map data.

The central unit 500 may be configured to align in the view of the user at least one point 211 of the symbol 210 to the virtual point 411. The alignment may be based on the user's point of view 301, the user's point of view 301 being the position 301 of the user's eyes.

Figure 4:
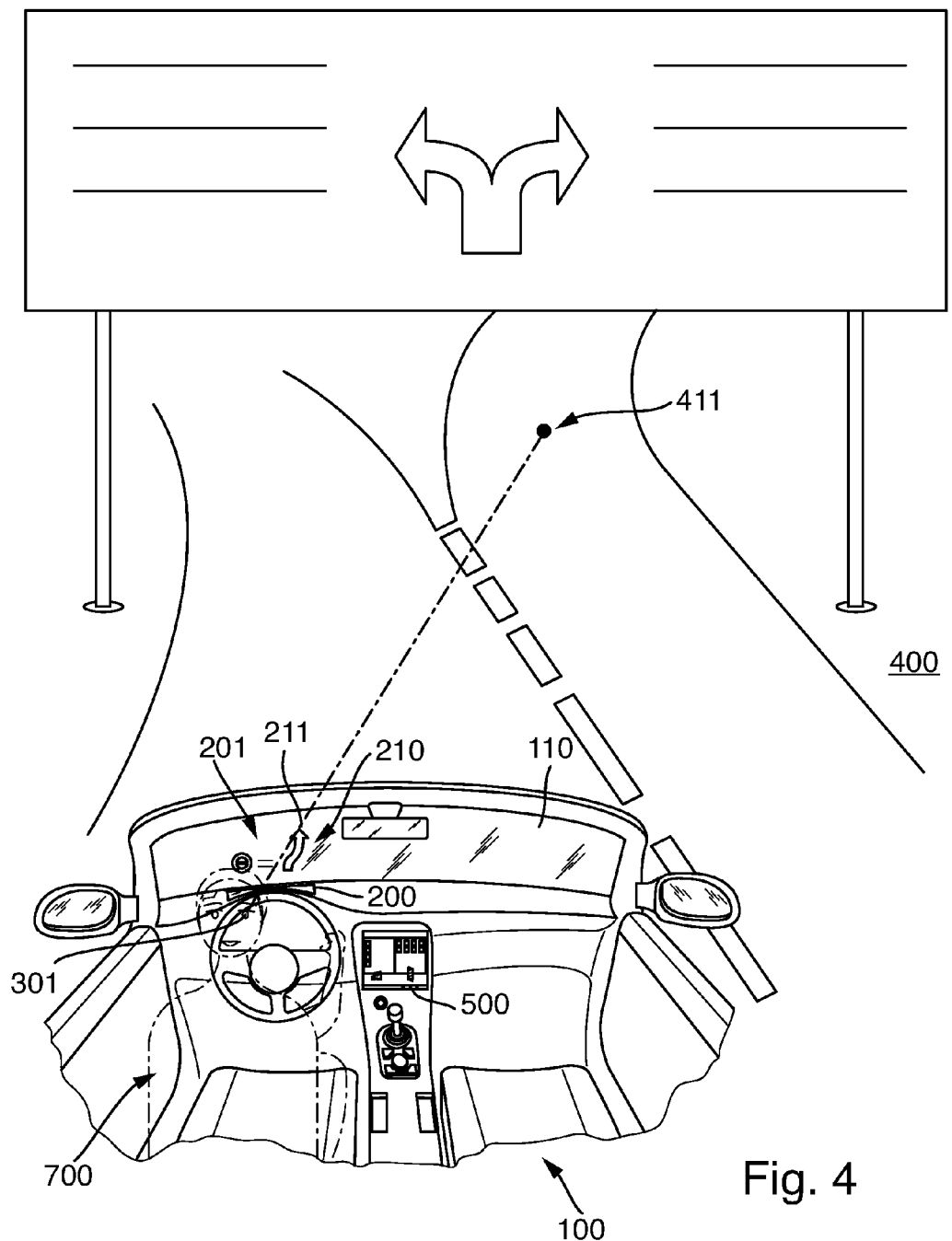
FIG. 4 a schematic representation of a vehicle in its surrounding.

FIG. 4 shows a three-dimensional schematic view of a vehicle 100 in its surrounding 400. The vehicle 100 is driven by the user 700 in the driver position of the vehicle 100. The user 700 is shown in a transparent manner to additionally show the dashboard and the windshield 110 in front of the user 700. According to one embodiment shown in FIG. 4 an system is provided in the vehicle 100. The system may have a central unit 500 and a head-up display 200 connectable to the central unit 500. The head-up display 200 is configured to project an image 201 onto the windshield 110 of the vehicle 100.

Additionally shown in FIG. 4 is the point of view 301 of the user 700, the point of view 301 being the position of the user's eyes. The user may look through the windshield 110 viewing the surrounding 400 of the vehicle 100, e.g. roads and traffic. Within the sight field of the user 700 there appears the image 201 projected onto the windshield 110. The image 201 may be semi-transparent.

The central unit 500 may be configured to run a program with several method steps. According to one embodiment at least one point 211 of a symbol 210 shall be aligned to the virtual point 411 in the surrounding 400. In the view of the user 700 a symbol 210 within the image 201 may be projected onto the windshield 110 of the vehicle. The symbol 210 may be output as a part of the image data S200 by means of the central unit 500.

A user's point of view 301 may be ascertained by means of the central unit 500. The user's point of view is the position 301 of the user's eyes. The ascertaining of the user's point of view 301 is further explained in one embodiment of FIG. 7. According to one embodiment of FIG. 4 a virtual point 411 in the surrounding 400 of the vehicle 100 may be ascertained based on a recorded image of the surrounding 400 and/or a current position of the vehicle 100 by means of the central unit 500. According to one embodiment the virtual point 411 may be calculated based on a manoeuvre point of a calculated route and map data. If the vehicle approaches the manoeuvre point, the virtual point 411 may be set to a new position. At the same time the position of the point 211 of the symbol 210 may be aligned, so that the point 211 and the virtual point 411 overlap. Also if an angle between the driving and a viewing direction towards the virtual point 411 change, the position of the point 211 of the symbol may be updated concurrently for alignment.

It is also possible, that the user 700 changes a position of the head, which is quite usual in stress situations, so that the point of view 301 may change correspondingly. So in the view of the user 700 the at least one point 211 of a symbol 210 may be aligned to the virtual point 411 by means of the central unit 500, wherein the alignment is based on the user's point of view 301.

Figure 5:
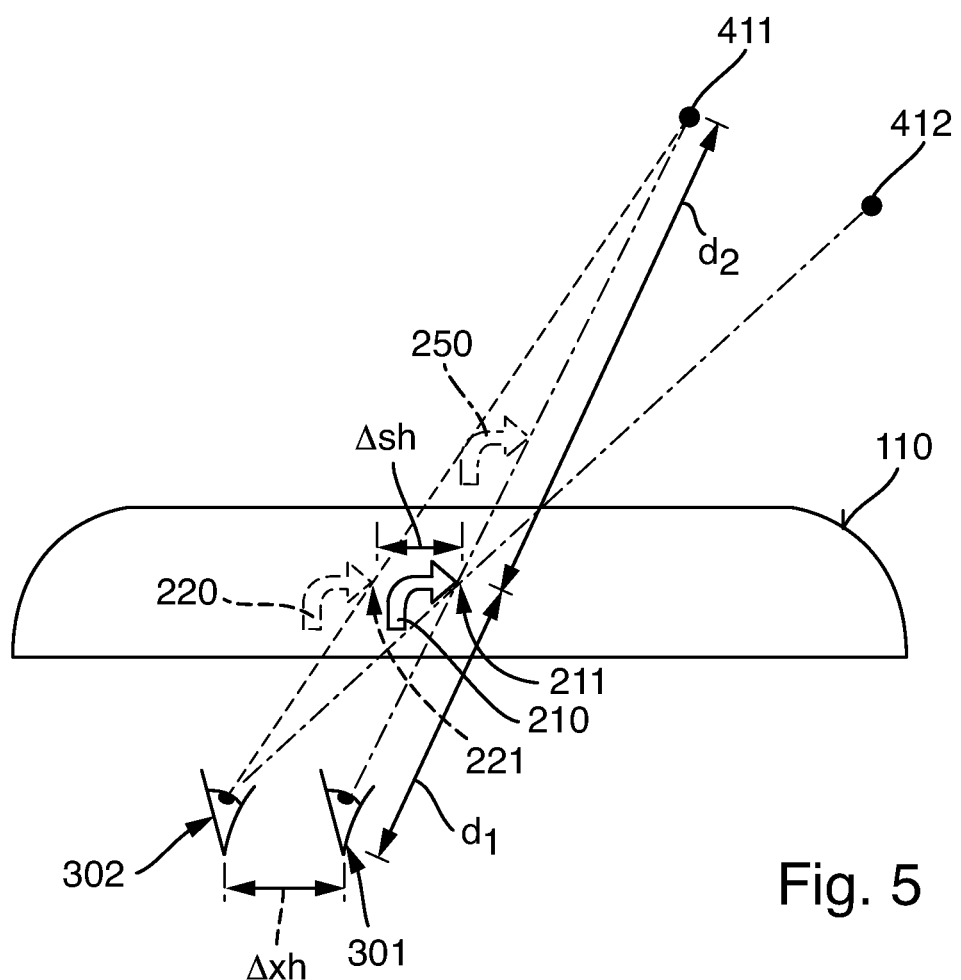
FIG. 5 another schematic representation of viewing directions in an imaging system.

In FIG. 5 a schematic graphic with a windshield 110 and viewing directions is shown. Onto the windshield 110 a symbol 210 included in a projected image 201 is shown. The symbol 210 is a curved arrow indicating a change in driving direction the user should perform following the route.

Using geometrical optics, e.g. mirroring technique, the focus may be adjusted in an area outside the vehicle 100, so that the symbol 250 of the image 411 may appear virtually in front of the vehicle 100 e.g. of above the front lid. In FIG. 5 such a symbol 250 is schematically shown in doted line. For further explanation of embodiments it is assumed that the focus may be adjusted in the plane of the windshield 110. Nevertheless all embodiments may also be combined with the focus being adjusted in the area outside the vehicle 100.

Shown in FIG. 5 are a first distance d1 between the point of view 301 of the user and the windshield 110 and a second distance d2 between the windshield 110 and a virtual point 411 in the surrounding 400 of the vehicle, as shown in FIG. 4. In all cases the second distance d2 is greater than the first distance d1. This causes a parallax in the view of the user, if the first point of view 301 is at least temporally shifted to a second point of view 302, e.g. by head movement. Shown in FIG. 5 is the shift Δxh to the left. The parallax is a displacement or difference in the apparent position of an object viewed along these two different lines of sight, and is measured by the angle or semi-angle of inclination between those two lines. In the first point of view 301 the point 211 and the virtual point 411 overlap. In the second point of view 302 the point 211 and the virtual point 411 do not overlap. In the view of the user the point 211 of the symbol 210 and another unwanted point 412 overlap, so that the arrow points into the wrong direction. To improve the accuracy the arrow may be shifted accordingly.

The central unit 500 may be configured to calculate the alignment of the at least one point 211 of the symbol 210 e.g. based on trigonometric functions. Alternatively a lookup table (LUT) may be used having offset value for shifting the point 211 of the symbol 210 based on the measured shift Δxh of the point of view 301. According to one embodiment of FIG. 5 the complete symbol 210 moved by the shift Δsh in the same direction transversally. The moved symbol 220 with point 221 is shown in FIG. 5 schematically, wherein the point 221 and the virtual point 411 overlap again. According to one embodiment the central unit 500 may be configured to align the position of the at least one point 211 of the symbol 210 to the virtual point 411 concurrently based on at least one of a shift of the virtual point 411 and a shift Δxh of the position 301 of the user's eyes.

Figure 6:
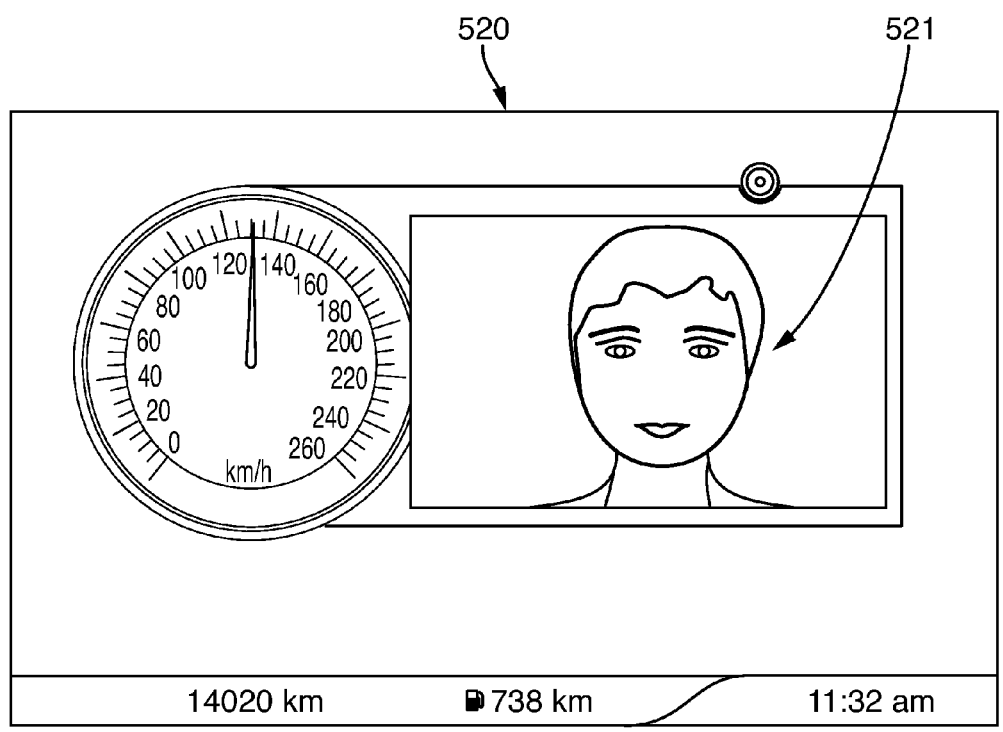
FIG. 6 a schematic representation of a display.

According to one embodiment of FIG. 6 a face-tracking software may be used to display applications in an instruments cluster display 520. For the face-tracking an interior camera 510 may be used. The central unit 500 may be configured to track the movement of the face of the user 700. This information of the face —e.g. the movement of the eyes —of the user 700 may be analyzed in a workload manager controlling applications to be performed, e.g. if images of the applications are displayed in a display 200, 520, 530. According to one embodiment of FIG. 6 the position of the face may be schematically displayed in the instrument cluster display 520 showing the face-tracking and the current position 301 of the user's eyes and/or the user's head.

Figure 7:
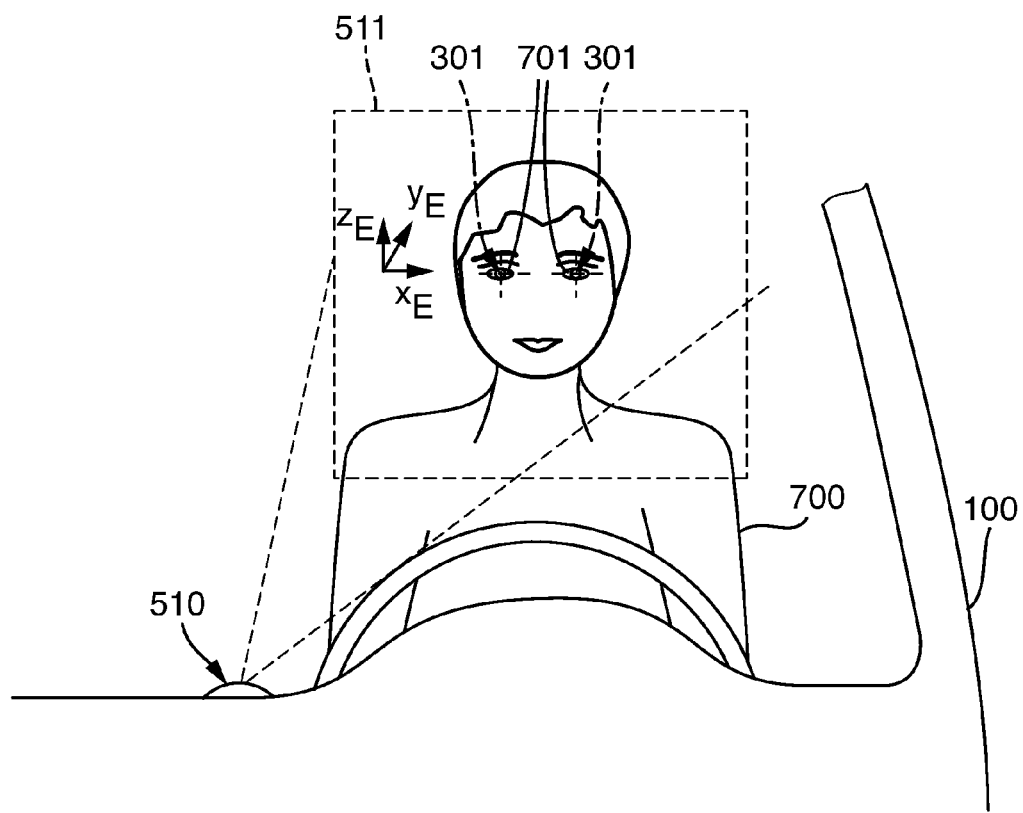
FIG. 7 a schematic representation of a user in a vehicle.

FIG. 7 shows a schematic view of the user 700 in the vehicle 100. FIG. 7 also shows the user's head and the user's eyes 701 and the position 301 of the user's eyes 701 schematically. The system may have an internal camera 510 recording an image 511 of the user 700, particularly the image 511 includes the image data of the eyes 701 of the user 700. The internal camera 510 may be directed towards the user's face. The central unit 500 may be configured to recognize the user's eyes 701. The user's eyes 701 may be recognized comparing known image data of human eyes with patterns of the recorded image 511. The central unit 500 may be configured to ascertain the position 301 of the user's eyes 701 within the recorded image 511 of the user 700. According to one embodiment the position 301 of the user's eyes 701 may be estimated in three dimensions xE, yE, zE. According to one embodiment the central unit 500 may be configured to track the position 301 of the user's eyes 701 concurrently. According to one embodiment the position of the user's eye is alternatively calculated from the shape and position of the user's head.

Figure 8:
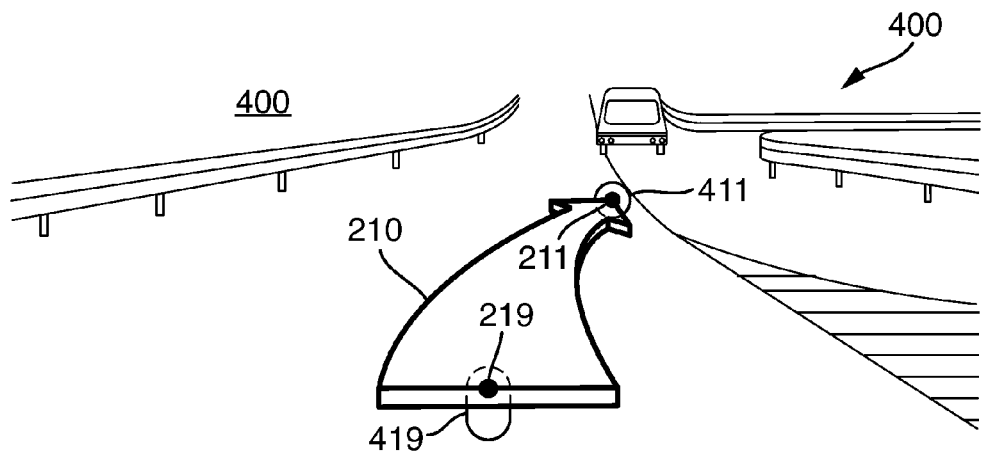
FIG. 8 a schematic representation of an augmented reality.

According to one embodiment in FIG. 8 driving and/or navigation information may be displayed in a head-up display 200, generating an augmented reality. The infotainment system provides an imaging system of a motor vehicle 100. The imaging system may have an image capture device 611 which is configured to record an image of the environment 400 of the motor vehicle 100 in the form of image data S611, as shown in FIG. 2. A central unit 500 may include or be in communication with an arithmetic unit 540. The arithmetic unit 540 may be configured to determine a virtual space from the image data S611. The arithmetic unit 540 may be configured to detect a real object in the image data S611. The arithmetic unit 540 may be configured to add a virtual element 210 to the virtual space. According to one embodiment of FIG. 8 the virtual element may be an arrow 210 for navigation purposes.

The imaging system may be a part of a system of the motor vehicle 100. A central unit 500 of the system may be connected to the image capture device 611, for example, via cables or a communication bus. The image capture device 611 may be an optical system for recording image data S611. The image capture device 611 may have a plurality of cameras, for example CMOS or CCD cameras. The cameras may be situated for stereoscopic recording. The arithmetic unit 540 may be a processor, such as at least one of a central processing (CPU) or a digital signal processor (DSP).

The virtual space may be determined in three dimensions based on a geometry of a road of the environment 400. For example a distance may be ascertained based on the geometry of a road, and the detected object may be situated in the ascertained distance within the virtual space.

Figure 9:
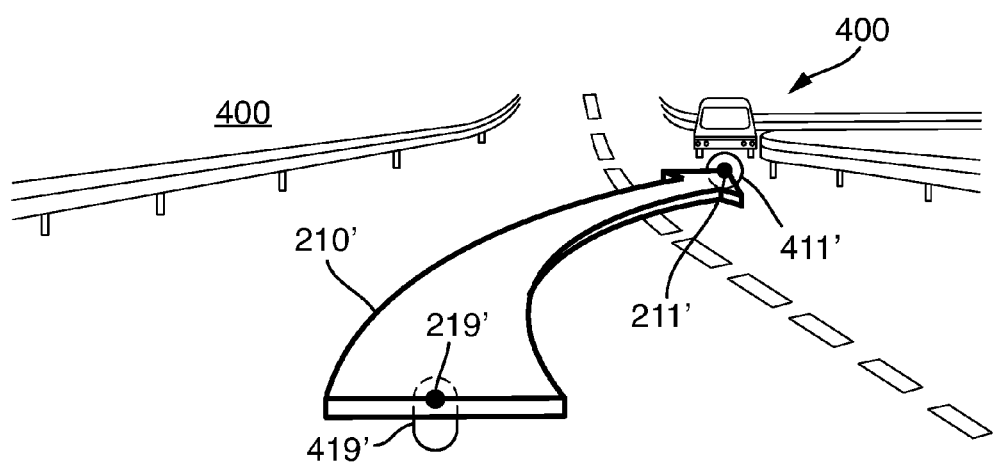
FIG. 9 another schematic representation of an augmented reality.

FIGS. 8 and 9 show one example having a route guidance symbol 210 displayed by a head-up display 200 onto the windshield 110 of a vehicle. Behind the symbol 210 the surrounding 400 of the vehicle is shown schematically. FIGS. 8 and 9 show an example, in which the first virtual point 419 is fixed in the view of the driver. Therefore starting point 219 of the symbol 210 is fixed within the reflection area 299. The second virtual point 411 and therefore the end point 211 of the symbol 210 may change while approaching the maneuver point of a route. FIGS. 3, 5 and 8 show the overlapping of the points 211, 411 according to the driver's point of view 301. Also shown is the overlapping of another point 219 of the symbol 210 and another virtual point 419 in the surrounding 400.

The central unit 500 may be configured to determine the virtual point 411 on the road by estimating a multidimensional domain out of image data S611 of an image recorded. The image may be recorded by a front camera 611. The virtual point 411 is determined within the multidimensional domain. The multidimensional domain may be a three dimensional domain.

According to one embodiment the central unit 500 may be configured to change the shape and/or the transparency and/or the colour of the symbol 210 based on the user's point of view 301. According to one embodiment the symbol 210 is generated based on a rendering algorithm. The shape and/or the transparency and/or the colour of the symbol 210' during the rendering process may be changed by adjusting the rendering parameters based on the current user's point of view 301. This may result in a pseudo-three-dimensional effect, so that the symbol 210' may appear to the user as a three-dimensional object. In FIG. 9 a change of the shape of the symbol 210' is shown schematically. Additionally points 211', 419' and corresponding virtual points 411', 419' in the surrounding 400 have been moved in comparison to FIG. 8.

Figure 10:
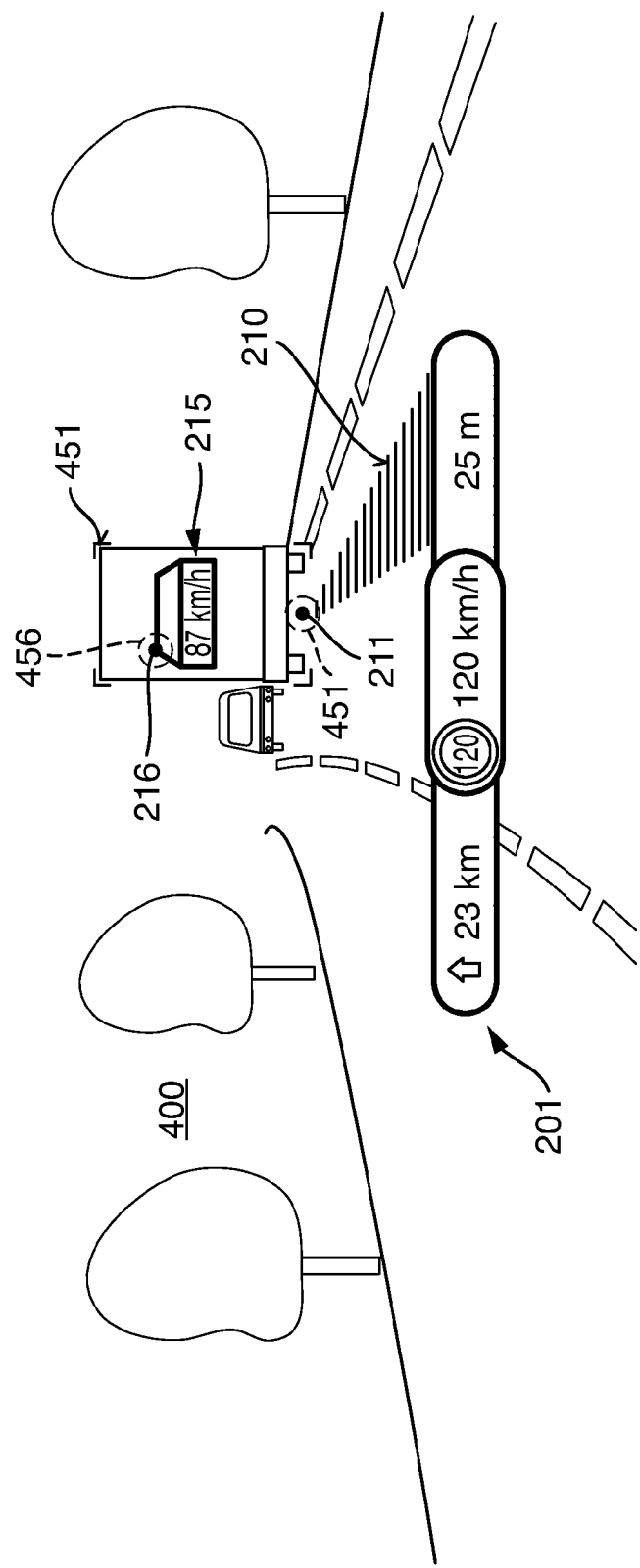
FIG. 10 another schematic representation of an augmented reality.

According to one embodiment of FIG. 10 a system of a vehicle 100 having an imaging system is provided. The system may have a head-up display 200. The infotainment system may have means 611, 615 for recognizing an object 451 as a part of in the surrounding 400, e.g. a road user 451. The road user 451 may be motorized, like another motor vehicle. According to one embodiment of FIG. 10 the recognized object 451 may be marked. The system may have a central unit 500 connectable to the head-up display 200 and the means 611, 615 for recognizing. The central unit 500 may be configured to send image data S200 to the head-up display 200 to be displayed. The head-up display 200 may be configured to project an image 201 onto the front windshield 110 visible by a user (such as the driver) in the vehicle 100. The image 201 may be based on the image data S200.

The central unit 500 may be configured to output a distance between the vehicle 100 and the recognized road user 451. The central unit 500 may be configured to output a velocity 215 of the recognized road user 451. A velocity symbol 215 showing the velocity, e.g. in the form of a speed value, of the object 451 may have point 216. According to one embodiment the central unit 500 may be configured to align the point 216 of the velocity symbol 215 to a virtual point 456 of the object 451. The central unit 500 may be configured to output a (negative or positive) acceleration of the recognized road user 451.

The central unit 500 may be configured to include an information item, e.g. a symbol 210 indicating a distance between the vehicle 100 and the recognized road user 451 and/or the symbol 215 of the velocity of the recognized road user 451 and/or the acceleration of the recognized road user 451 in the image data S200. A position of the information item, e.g. the symbol 215 of velocity and the position of the recognized road user 451 may overlap in a view of the user 700 of the vehicle 100. According to one embodiment of FIG. 10 the central unit 500 may be configured to ascertain a virtual point 452 of the object 451 in the surrounding 400 of the vehicle 100 based on a recorded image of the surrounding 400. The central unit 500 may be configured to align in the view of the user 700 at least one point 211 of the distance symbol 210 to the virtual point 452 of the object 451, wherein the alignment is based on the user's point of view 301.

According to one example in FIG. 10 it is shown that a distance between the vehicle 100 and the recognized road user 451 is currently 25 meter. The velocity of the recognized road user 451 is currently 87 km/h.

According to one embodiment of FIG. 10 the system may have a capture device 611 recording an image of the surrounding 400. The central unit 500 may be configured to ascertain a three dimensional space of the surrounding 400 based on image data S611 of the surrounding 400. The central unit 500 may be configured to recognize an object 451 within the image of the surrounding 400. The recognized object may have a virtual point 452, 456 in the three dimensional space.

The central unit 500 may be configured to align the at least one point 211 of the symbol 210 to the virtual point 452 of the recognized object 415 based on the position of the virtual point 452 of the recognized object 451 and the user's point of view 301.

Figure 11:
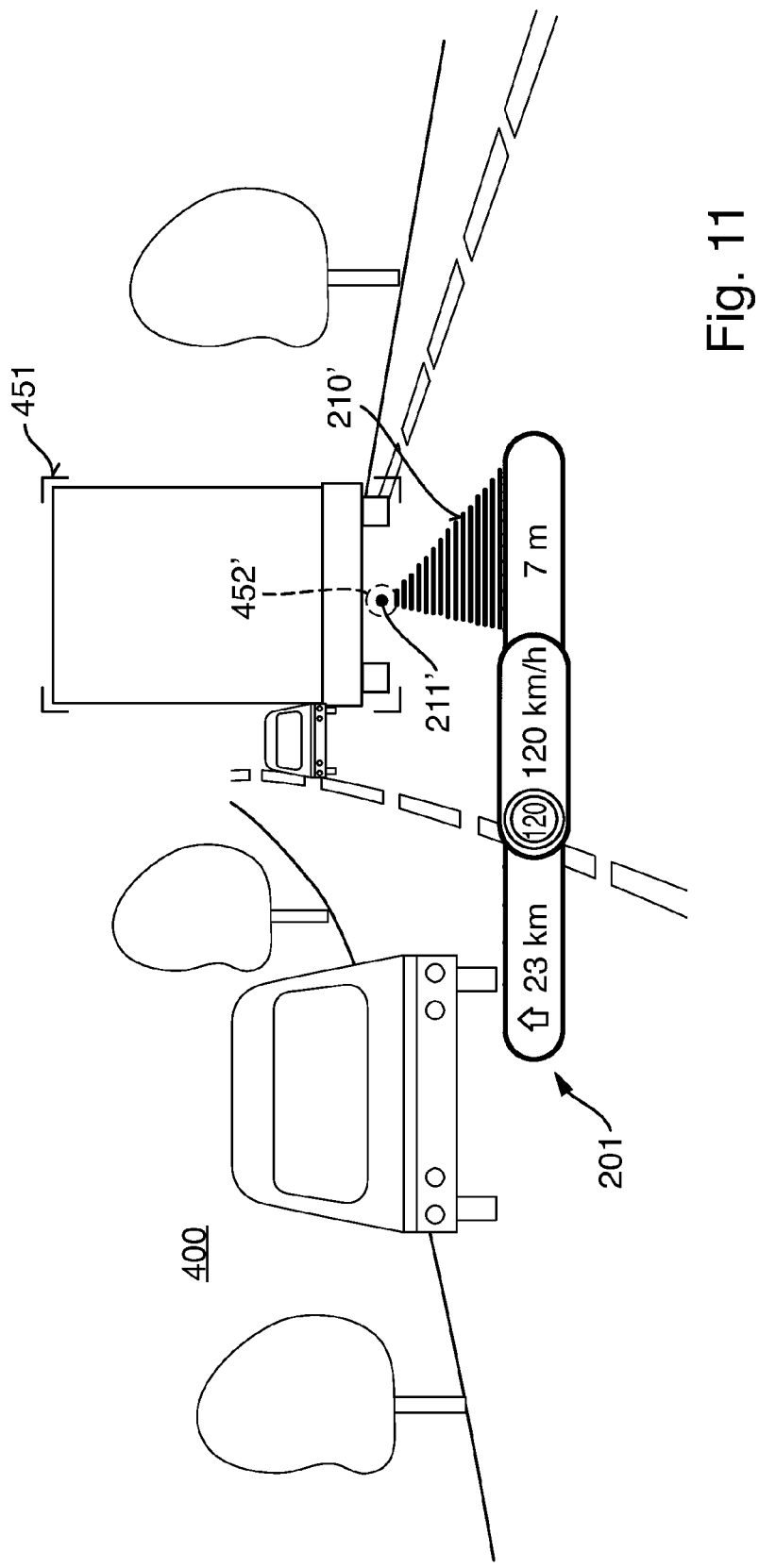
FIG. 11 another schematic representation of an augmented reality.

According to one example of FIG. 11 a distance between the vehicle 100 and the recognized road user 451 is displayed (7 meter). The distance may be compared with a threshold concurrently. The threshold may be estimated depending on the current speed of the vehicle 100. The central unit 500 may be configured to change the appearance of the distance if the estimated distance is below a threshold. According to the embodiment of FIG. 11 a colour of a distance symbol 210' is changed to a predetermined color, such as red. The central unit 500 may be configured to display an extra warning symbol included in the displayed image 201. The central unit 500 may be configured to output an additional sensory warning, such as an acoustical warning signal —such as a beep or spoken text —at about the same time.

According to one embodiment of FIG. 11 the central unit 500 is configured to change the shape and the colour of the symbol 210' based on the user's point of view 301 and based on a change of the position of the virtual point 452' of the recognized object 451. According to the shown example of FIG. 11 the vehicle 100 may be closer to the recognized object 451 compared to the example shown in FIG. 10. Hence the virtual point 452' and the point 211' of the symbol 210' have been changed. The symbol 210' has been changed in shape and colour.

Figure 12:
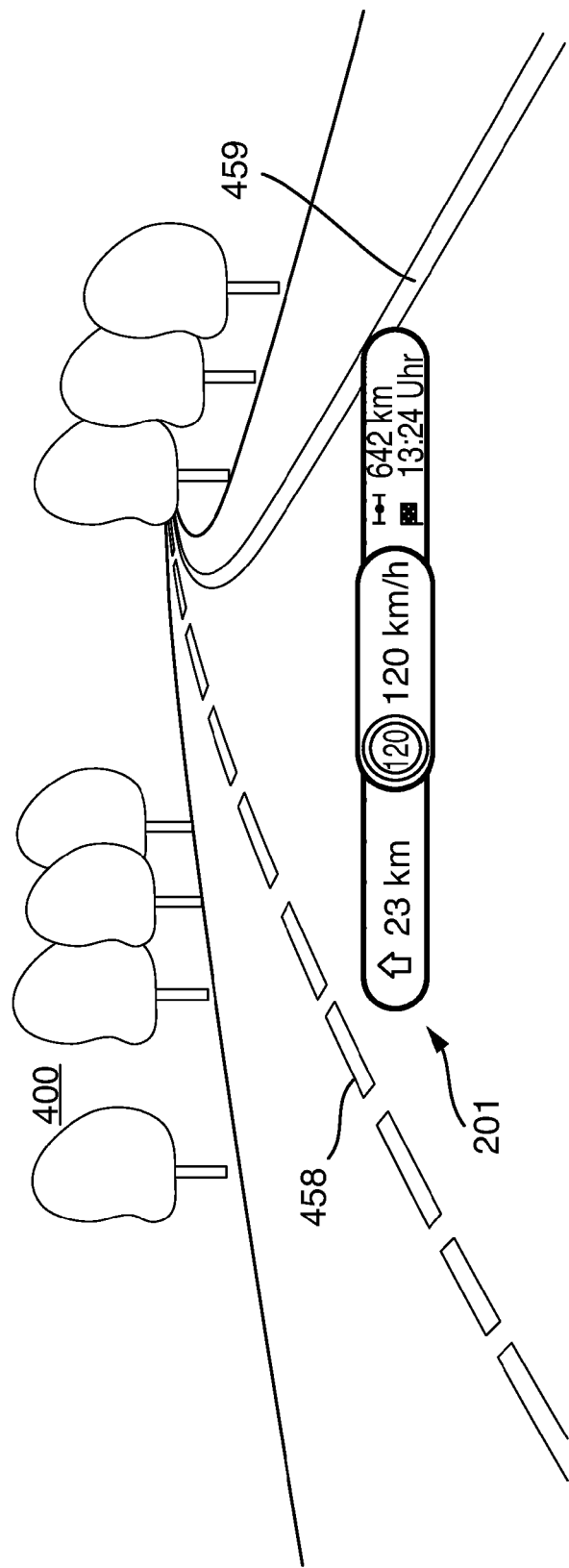
FIG. 12 another schematic representation of an augmented reality.

According to one embodiment of FIG. 12 the central unit 500 may be configured to recognize markings 458, 459 on the road. The markings 458, 459 may be regarded as objects. The central unit 500 may be configured to estimate the current position of vehicle 100 in relation to the recognized markings 458, 459. In FIG. 12 the recognized markings 458, 459 may be superposed by virtual elements showing the successful recognition to the user 700.

Figure 13:
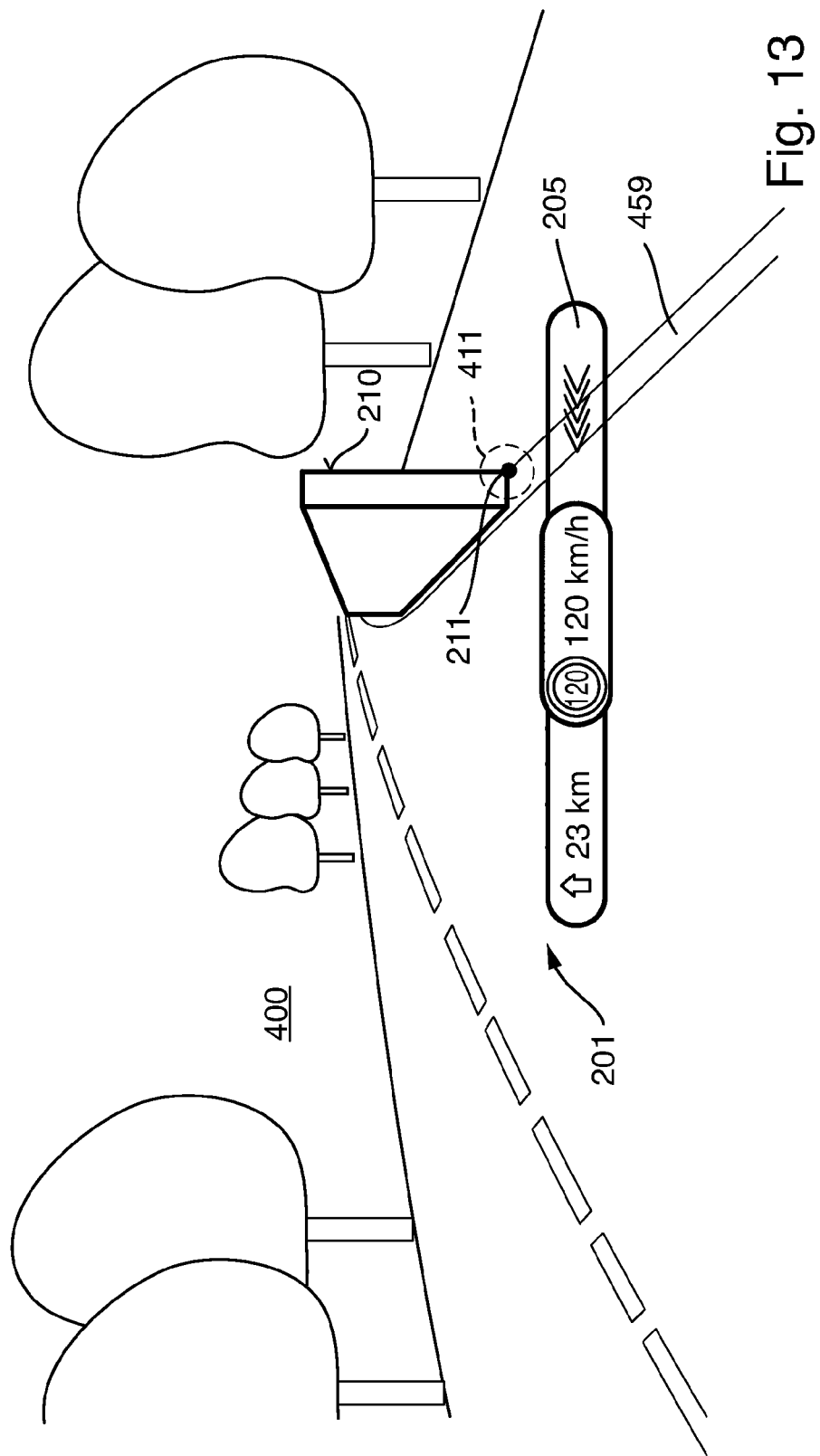
FIG. 13 another schematic representation of an augmented reality.

According to one embodiment of FIG. 13 a system of a vehicle 100 that includes an imaging system is provided. The system may have a head-up display 200. The system may have means 611, 615 for recognizing a limitation of the road, the limitation being visible for a user 700 in the vehicle 100. The limitation may be a marking 459 on the road or wall or curb. The means may be a camera 611. The means may be a distance sensor 615. The infotainment system may have a central unit 500 connectable to the head-up display 200 and to the means 611, 615 for recognizing.

The central unit 500 may be configured to send image data S200 to the head-up display 200 to be displayed. The head-up display 200 may be configured to project an image 201 onto the front windshield 110 visible by the user 700 (such as the driver) in the vehicle 100. The image 201 may be based on the image data S200.

The central unit 500 may be configured to output a symbol 210, when an estimated distance between the vehicle 100 and the recognized limitation 459 is below a threshold. The central unit 500 may be configured to include the symbol 210 in the image data S200 so that a position of the symbol 210 and the position of the limitation 459 overlap in a view of the user 700 of the vehicle 100. A virtual point 411 of the limitation 459 in the surrounding 400 of the vehicle 100 may be ascertained based on the recorded image. In the view of the user 700 at least one point 211 of the symbol 210 may be aligned to the virtual point 411 by means of the central unit 500, wherein the alignment is based on the user's point of view 301. Additionally a plurality of points of the symbol 210 may be aligned to a plurality of virtual points of the limitation, so that the shape of the symbol 210 may be adapted to the course of the limitation.

According to one embodiment of FIG. 13 the symbol 210 is a red, semi-transparent wall overlapping the white marking 459 limiting the lane the driver 700 should drive on. Additionally the image 201 has an animated (flashing) arrow 205, showing the direction for correct driving.

Figure 14:
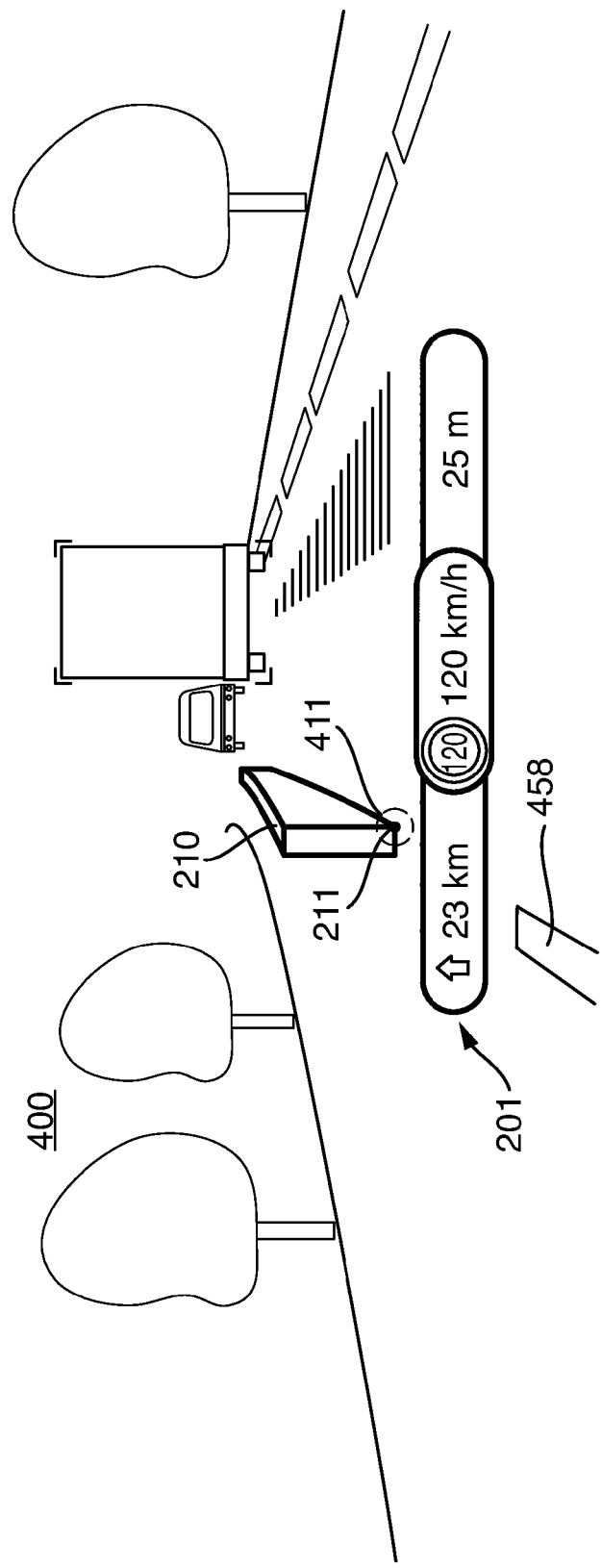
FIG. 14 another schematic representation of an augmented reality.

According to one embodiment of FIG. 14 a system of a vehicle 100 is provided. The system may have a head-up display 200. The system may have means 611, 615 for recognizing a marking 458 separating two lanes of a road, the marking 458 being visible to a. user 700 in the vehicle 100. The marking 458 may also referred as median strip. The system may have a central unit 500 connectable to the head-up display 200 and the means 611, 615 for recognizing The central unit 500 may be configured to send image data S200 to the head-up display 200 to be displayed. The head-up display 200 may be configured to project an image 201 onto the front windshield 110 visible by the user 700 (such as the driver) in the vehicle 100. The image 201 may be based on the image data S200.

The central unit 500 is configured to output a symbol 210, when a road user is detected on the other side of the marking 458. The road user may not be visible to the user of the vehicle 100, if the road user is currently in the blind spot. The road user may be detected by evaluating the signals of distance sensors or image data.

The central unit 500 may be configured to include the symbol 210 in the image data S200 so that a position of the symbol 210 and the position of the marking 458 overlap in a view of the user 700 of the vehicle 100. A virtual point 411 of the marking 458 in the surrounding 400 of the vehicle 100 may be ascertained based on the recorded image. In the view of the user 700 at least one point 211 of the symbol 210 may be aligned to the virtual point 411 by means of the central unit 500, wherein the alignment is based on the user's point of view 301.

In one example of FIG. 14 the symbol 210 is a red semi-transparent wall placed on the white marking 458 on the road.

While various embodiments of the invention have been described, it will be apparent to those of ordinary skill in the art that many more embodiments and implementations are possible within the scope of the invention. Accordingly, the invention is not limited to the aforementioned embodiments.

LIST OF REFERENCES 100 vehicle
110 combiner, windshield
120 dashboard
130 steering wheel
140, 150 seat
170 gear shift
200 head-up display
201 image
205 arrow
210, 215, 220, 250, 210' symbol
211, 216, 219, 221, 211', 219' point
299 reflection area
301, 302 point of view
400 surrounding
411, 419, 411', 419', 452, 452', 456 virtual point
412 point
451, 458, 459 object
500 central unit
510 internal camera
511 image
520 display
530 central display
540 circuit, arithmetic unit, processor
541, 542 function block
601, 602 sensor
603, 604 input device
605 microphone
606, 607 near field communication device (NFC)
608 interface
609 satellite receiver
610 transceiver
611, 612, 613, 614 camera
615, 616, 617, 619 distance sensor
700 user
701 eyes
791, 792 mobile device
S3, S200, S201, S510, S520, S530, S609, S611, S612 signal
Δsh, Δxh shift
d1, d2 distance

The invention claimed is:

1. A system for a vehicle, comprising:
   a head-up display,
   a central unit connected to the head-up display, the central unit including a user interface,
   wherein the head-up display is configured to project an image onto a front windshield of the vehicle or onto a separate combiner,
   wherein the central unit is configured to send image data to the connected head-up display to be displayed,
   wherein the central unit is configured to ascertain a position of the user's eyes,
   wherein the central unit is configured to output a symbol within the image data,
   wherein the central unit is configured to a three dimensional space in a surrounding of the vehicle based on map data of the surrounding,
   wherein the central unit is configured to recognized an object within the map data of the surrounding, the recognized object having a virtual point in the three dimensional space,
   wherein the central unit is configured to align at least one point of the symbol to the virtual point of the recognized object based on a position of the virtual point of the recognized object and the position of the users eyes's, and
   wherein the object comprises a limitation of a road which limits a lane a driver of the vehicle is to drive on, and wherein the central unit is configured to align a plurality of points of the symbol to a plurality of viral points of the limitation of the road so that a shape of the symbol is adapted to a course of the limitation.

2. The system according to claim 1, wherein the symbol is a semi-transparent wall overlapping the limitation of the road.

3. The system according to claim 1,
   having a camera recording an image of the user,
   wherein the central unit is configured to recognize the user's eyes or a user's head, and
   wherein the central unit is configured to ascertain the position of the user's eyes based on the recognized eyes or head within the recorded image of the user.

4. The system according to claim 1,
   wherein the central unit is configured to track the position of the user's eyes or a user's head.

5. The system according to claim 1,
   wherein the central unit is configured to change a shape and/or a transparency and/or a color of the symbol based on the position of the user's eyes.

6. The system according to claim 1,
   having adjustment means for adjusting a position of the projected image within a plane of the front windshield,
   wherein the central unit is configured to ascertain the position of the user's eyes based on parameters of the adjustment of the projected image.

7. The system according to claim 1, wherein the central unit is configured to adjust a focus of the symbol in an area outside the vehicle, using geometrical optics, such that the symbol appears virtually in front of the vehicle.

* * * * *

UNITED STATES PATENT AND TRADEMARK OFFICE
CERTIFICATE OF CORRECTION

PATENT NO. : 10,029,700 B2  
APPLICATION NO. : 14/654467  
DATED : July 24, 2018  
INVENTOR(S) : Hans Roth et al.

Page 1 of 1

It is certified that error appears in the above-identified patent and that said Letters Patent is hereby corrected as shown below:

In the Claims

Column 16 in Claim 1, Line 5, correct "configured to a three dimensional space" to read "configured to ascertain a three dimensional space".

Column 16 in Claim 1, Line 8, correct "recognized" to read "recognize".

Column 16 in Claim 1, Line 14, correct "the position of the users eyes's, and" to read "the position of the user's eyes, and".

Column 16 in Claim 1, Line 18, correct "viral" to read "virtual".

Signed and Sealed this  
Second Day of October, 2018

Andrei Iancu  
*Director of the United States Patent and Trademark Office*

UNITED STATES PATENT AND TRADEMARK OFFICE
CERTIFICATE OF CORRECTION

PATENT NO. : 10,029,700 B2
APPLICATION NO. : 14/654467
DATED : July 24, 2018
INVENTOR(S) : Roth et al.

It is certified that error appears in the above-identified patent and that said Letters Patent is hereby corrected as shown below:

On the Title Page

(72) Inventors ADD:
--Kelei Shen, Dulach, DE;
Alexa Wackernagel, Vitlers, CH;
Stefan Marti, Oakland, CA--.

Signed and Sealed this
Twenty-third Day of January, 2024

Katherine Kelly Vidal
*Director of the United States Patent and Trademark Office*